Feb. 12, 1929.  1,701,901
F. WAAP
HYDRAULIC CHANGE GEAR
Filed Feb. 6, 1925   2 Sheets-Sheet 2

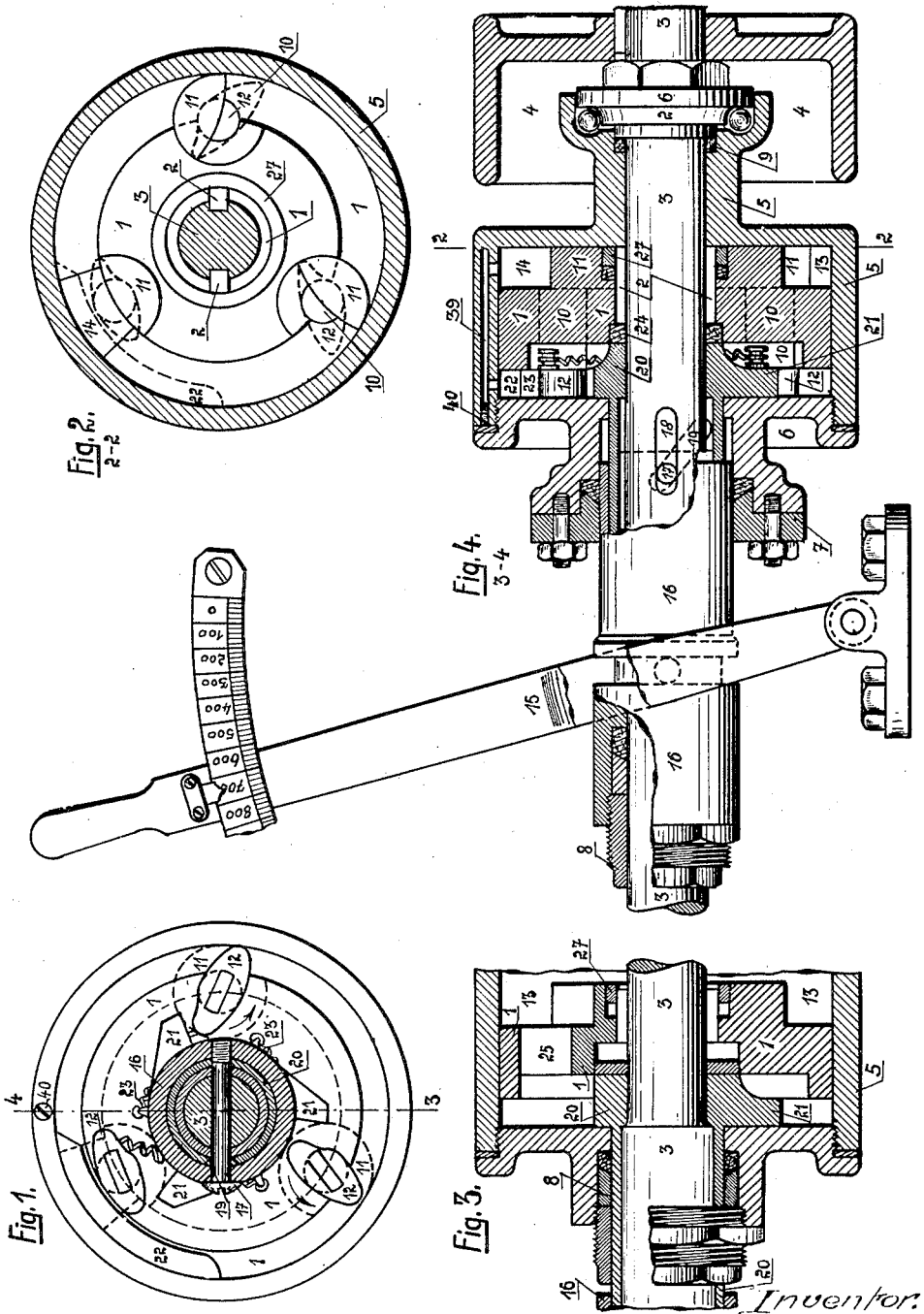

Inventor
Fritz Waap
by Carton Neisheld
Attorney

Patented Feb. 12, 1929.

1,701,901

UNITED STATES PATENT OFFICE.

FRITZ WAAP, OF DRESDEN, GERMANY.

HYDRAULIC CHANGE GEAR.

Application filed February 6, 1925, Serial No. 7,350, and in Germany February 18, 1924.

The known types of claw, cone, friction and similar clutches act upon the machine or motor by jerks and shocks in a manner injurious to the machine, motor and clutch, while increases or reductions in the number of revolutions by means of suitable tooth gears or other serviceable gears can be effected only after the speed of the machine or motor has been correspondingly reduced and the power machine uncoupled.

Gears provided with balls arranged in grids permit the regulation of the speed during the trip in several stages while the machine or motor continues to run, but the efficiency is too low and the wear too great.

Attempts were made to eliminate these drawbacks by means of the known types of fluid or hydraulic clutches, but they have not given complete satisfaction in practical operation.

The present invention makes it possible to regulate the driving force of a power machine built for, and adjusted to, a certain number of revolutions according to requirements while the machine continues to run. The application of the driving force can thus be regulated during operation from no-load to full-load, while the efficiency of the gear is very high and the amount of wear negligible.

The progress made in this respect is of greatest importance for all power machines, particularly locomotives, street railways, automobiles, motor cycles, ships, aeroplanes, electric motors, ventilators, machine tools and transmissions.

The nature of the invention is set forth in the appended specification and claims.

The drawings represent several modifications of one and the same invention.

Figs. 1-4 illustrate a modification adapted to be used as a transmission gear, Fig. 1 being a cross section of the device according to Fig. 4 after the cover 6 and the stuffing box 7 have been removed. The intersecting line runs through the slide 16, the socket 20, shaft 3 and the center of bolt 17.

Fig. 2 is a cross section along the line 2—2, Fig. 4.

Figs. 3 and 4 are longitudinal sections on the line 3—4, Fig. 1.

Figure 5:
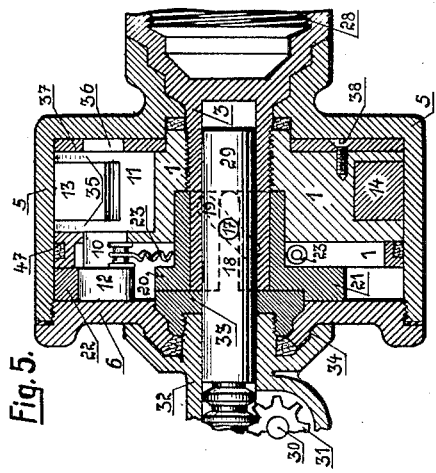
Fig. 5 is a longitudinal section of a modification.

The body of the gear 1 is firmly connected with the shaft 3 driven by pulley 4 by keys 2, and rotates in the casing 5, which is closed water-tight by the cover 6 and the stuffing boxes 7, 8 and 9. Within the body 1 the shafts 10 of the accurately balanced vanes 11 are rotatably arranged so as to fit tightly, the balancing of the vanes 11 being due to their symmetrical execution on both sides of the shaft so that no turning moment is transmitted to them, no matter in what position they are, while pressure only is transmitted to the shaft 10. Secured to the projecting ends of the shafts are the stops 12. In the annular space filled with water like the other hollow spaces in the gear or with oil, glycerine or other suitable liquids is found the cam 14 which is firmly connected with the casing. By operating a lever 15 the slide 16 which rotates with shaft 3 can be shifted either to the right or left on the shaft while the slide 16 is prevented from turning around the shaft 3 by the bolt 17 which slides in the slot 18 of the shaft. This bolt 17 is fastened to the slide and passes through two oppositely and obliquely arranged slots 19 of the socket 20 whose teeth 21 (Fig. 1) adjust the stops 12 and vanes 11. Before passing the cam 14 during the turning of the body the vanes are pushed back into their pockets by a segment 22 which is secured to the casing and which controls the stops 12. After passing cam 14 the vanes 11 are drawn back again into the adjusted position by the action of the springs 23 attached at one end to the socket 20 and at the other end to the other ends of the vanes.

Figure 6:
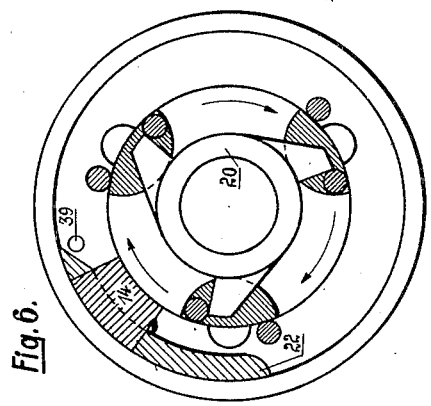

The gear is uncoupled or runs idle as long as all vanes are in their pockets, because the fluid ring in the annular space 13 remains stationary with the casing 5 and the cam 14. It does not cooperate in the rotation as no pressure is applied to the liquid (Fig. 6). If the gear is fully coupled the casing, which may be a pulley, friction disc, toothed wheel etc., makes exactly the same revolutions as the body of the gear even if loaded, because the three vanes with the temporary exception of the one passing the cam push the fluid ring in front of them, so that the cam and casing must rotate with the body of the gear as the water cannot escape. Slight opening of the vanes will permit the water to escape gradually from one vane chamber to the next. Pressure on the water is correspondingly decreased, and the speed of the casing is less than that of the body of the gear. The speed of the casing and body can be varied with respect to each other within very wide limits and as often as necessary according to the position occupied by the vanes. The speed of the casing can therefore be altered at will from zero (stop) up to the number of revolutions desired. The vanes can be adjusted from without while the driving machine or motor continues to run. The casing is then driven by the shaft, but conditions may be reversed and the shaft be driven by the casing.

To adjust the vanes, the lever 15 (Fig. 4) is turned to the right, and the slide 16 participates in the movement, whereby the socket 20, which cannot move axially, is turned by means of the bolt 17 sliding in the two oblique slots 19, on the shaft that its teeth 21 turn the stops 12 and also the vanes in the direction of the arrow (Fig. 1) until the latter have reached their final position in their pockets. If the lever is turned to the left (Fig. 4), the socket 20 will turn in the opposite direction, and the springs 23 will turn the vanes and stops 12 out of their pockets and into the annular space until full coupling has been accomplished whereby the annular space is divided into compartments or chambers The packing ring 24 prevents the liquid from passing through and between the socket 20 and shaft 3 while simultaneously pressing the left outer surface of the toothed part of the socket 20 against the cover 6 of the casing so as to produce a metallic packing between the socket and the casing The packing ring can be replaced by a ring provided with springs (Fig. 3) if a second packing between the shaft and slide by means of the stuffing box 8 outside on the left end of the slide has been provided. In Fig. 3 it is shown that a metallic packing between the shaft 3 and the left inside toothed surface of the socket 20 can be produced by strengthening the shaft 3. In Fig. 3 the section passes through the center of the shaft bore 25.

In a similar way the casing is packed towards the right by the ball bearing 26 in combination with the stuffing box 9 and the packing ring 27.

As shown in Fig. 5 packing may also be accomplished by accurately ground surfaces facing each other at various angles, whereby a longer bearing which would need much more space is dispensed with.

Such gears can be used for motors or other power machines, and one end of the hollow shaft 3 is correspondingly strengthened for this purpose while a member adapted to the size of the shaft of the power machine is screwed into the internal thread 28. The slide 16 has been replaced by the shaft 29 having a longitudinal bore which is not shown to permit the passing of the liquid from one end to the other during the movement. This shaft 29 can also be shifted from the outside by suitable means such as a hand wheel arranged on shaft 30 while the toothed wheel 31 arranged on the same shaft 30 cooperates in the movement. On the left the casing is packed by the cover 6 and the casing 32, the latter being connected to the cover 6. The closing piece 33 is connected with the casing 32 in a watertight manner and packs the inside of the cover 6 while the flange 34 packs its outside.

At the same time another modification of the vanes 11 has been employed to relieve them laterally and not only in the direction of rotation so as to remove the pressure on the casing in lateral direction. By applying water pressure the vanes will be pressed on the body 1 in the direction of the shaft 10 (Fig. 4) and the casing will try to shift to the right; for this reason the ball bearing 26 has been arranged. In Fig. 5 the vane surfaces have been arranged between two flanges 35 having the same diameter as the vanes; the flanges turn with the vane and take up water pressure equally on both sides. The right hand flanges as seen in Fig. 5 are further provided with guide pins 36 arranged in the covering disc 37 for the purpose of improving the guiding of the vane. This covering disc is firmly connected with the body 1 by screws 38 and prevents the liquid from passing out of the pockets between the vanes and body 1.

In one of the two annular chambers 13 (Fig. 4) there are formed several pressure compartments and a suction compartment by the vanes 11 and cam 14. All other hollow spaces filled with the same liquid, particularly the two annular chambers in which the shafts, stops, springs and the toothed socket move, constitute the suction chamber or space when the vanes are closed. This suction chamber is connected with the right-annular chamber by the narrow duct 39 which is closed by the screw 40, and the cover 6.

Figure 7:
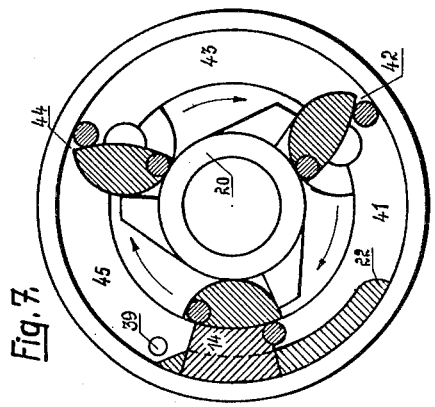

In the diagrams shown in Figs. 6 and 7 the vanes, cam and the segment behind them are marked by hatchings; the vane shafts by a semi-circle, the stops by black dots, and the suction duct by a small circle above the segment. Fig. 6 shows the relative position of these parts when the gear is uncoupled. All vanes are in their pockets, no pressure is applied to the liquid, the annular space is free from compartments, and the vanes can freely pass the cam. In Fig. 7 the vanes are swung out far enough to divide the annular space into compartments which, however, are not completely separated from each other. If the body 1 rotates in the direction of the arrows the liquid can give way in the direction of the cam only in so far and as quickly as the cam or casing cooperates in the rotation according to the prevailing load. As the body turns faster than the casing with the cam if the vanes are in this position, the liquid, to which pressure has been applied in compartment 41, will pass through the narrow opening 42 into the compartment 43 and thence through the narrow opening 44 into the third compartment 45. The compartment which happens to be in front of the cam (here number 41) gets smaller while the compartment behind the cam (here number 45) increases in size. In this latter compartment suction develops, and into this compartment opens the suction duct 39. Having left the pressure compartments the water enters here, is caught by the vane passing the cam and returned to the pressure compartment.

Figure 10:
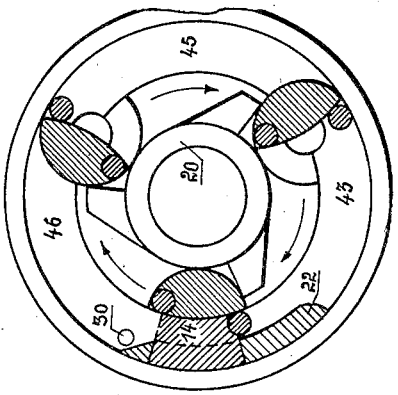
Figs. 6-10 show the operation in diagram.
Figure 9:
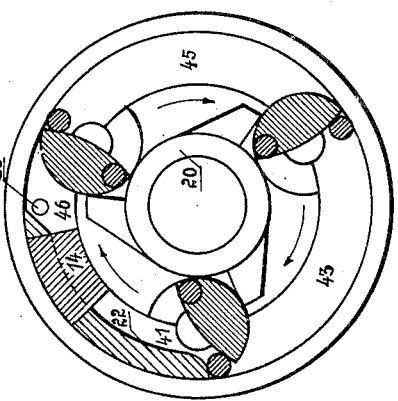
Figure 8:
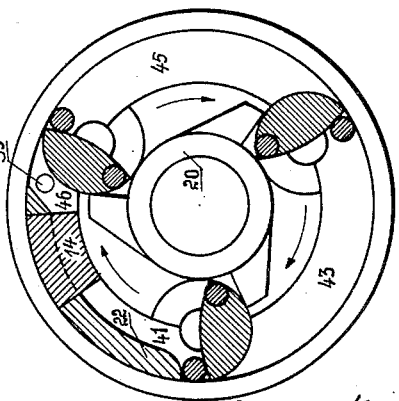

In Figs. 8, 9 and 10 the vanes are fully swung out so as to couple the gear completely. The liquid cannot pass from compartment 41 into compartment 43 etc. and is pressed against the cam which makes the same number of revolutions per minute as the body 1 or the shaft.

It is possible that the compartments will not be absolutely water-tight, no matter how carefully their parts have been ground, that the casing or cam will make only 99 revolutions while the vanes make approximately 100 and that the vanes pass the cam even when the gear is fully coupled, although this happens very rarely.

In Fig. 8 the stop is shown in the position of touching the segment, and the vane begins to rotate. Up to this position three pressure compartments numbers 41, 43 and 45 are formed while the former suction compartment 45 has been replaced by the suction chamber 46.

Fig. 9 shows how the vane is already opened at the segment so as to eliminate the compartment 41 as a pressure compartment and leave only two pressure compartments, i. e., numbers 43 and 45, in full operation while the compartment 46 remains the suction compartment.

In Fig. 10 the vane is shown fully swung into its pocket so that it lies opposite the cam. Compartments 43 and 45 still act as pressure compartments and compartment 46 as a suction compartment. As soon as the vane passes the cam and the spring 23 has closed the former, the compartment 46 ceases to function as a suction compartment and becomes a pressure compartment. The compartment 43 is divided by the cam into a reduced pressure compartment and a suction compartment which is just beginning to develop on a very small scale. The pressure compartment 43 gets smaller and the newly formed suction compartment gets larger in the manner described, and this process is reversed and repeated over and over again.

The hydraulic pressure produced in the pressure compartments 41, 43 and 45 (Figs. 8 and 9) is, in the example cited, used for power transmission only in so far as it acts upon the area of cam 14.

I claim:—

1. In a hydraulic change gear transmitting power by a liquid annularly enclosed by a power transmitting casing, the combination of a gear body part with pockets dividing the interior of the transmitting casing into two annular chambers filled with liquid and carrying balanced vanes attached to rotatable shafts and passing through one of the two chambers and being shaped to relieve axial shifting, stops attached to the other ends of the shafts of the said vanes and passing through the other one of the two chambers, a cam attached to the casing cooperating with the vanes, a segment attached to the casing for actuating the said vanes to move into the said pockets in the gear body part on passing the said cam, a slide and a toothed socket adapted to adjust the said vanes from the outside, and means for returning the vanes to their previously adjusted position.

2. In a hydraulic change gear transmitting power by a liquid annularly enclosed by a power transmitting casing, the combination of a gear body part with pockets dividing the interior of the transmitting casing into two annular chambers filled with liquid and carrying balanced vanes attached to rotatable shafts and passing through one of the two chambers and being shaped to relieve axial shifting, stops attached to the other ends of the shafts of the vanes and passing through the other one of the two chambers, a cam attached to the casing cooperating with the said vanes, a segment attached to the casing for actuating the said vanes to move into the said pockets in the gear body part on passing the said cam, a slide and a toothed socket adapted to adjust the said vanes from the outside, and springs adapted to return and hold the said vanes to their previously adjusted position.

3. In a hydraulic change gear of the type described, the combination of a casing with a gear body part with pockets, two annular chambers within the casing, balanced vanes rotatably arranged with their shafts in the said body part and shaped to relieve axial shifting, stops connected to the shafts of the vanes, a cam connected with one of the two annular chambers, a slide operatively connected with a toothed socket and adapted to adjust the said vanes from the outside, a segment attached to the casing and adapted to engage the said stops to turn the balanced vanes in the said pockets on passing the cam, and springs adapted to return and hold the said vanes to their previously adjusted position.

4. In a hydraulic change gear of the type described, the combination of a casing with the body of the gear, the latter dividing the interior of the casing into two annular chambers filled with liquid, balanced vanes rotatably arranged with their shafts in the said body and shaped to relieve axial shifting, stops connected to the shafts of the vanes, pockets in the said body to receive the vanes, a cam connected with the casing and cooperating with the vanes, the cam and vanes operatively dividing one of the two annular chambers into pressure compartments and a suction compartment, a suction duct connecting the suction compartment with the other one of the two annular chambers to keep the pressure compartments always filled with liquid, a slide operatively connected with a toothed socket and adapted to adjust the said vanes from the outside, a segment attached to the casing and adapted to turn the vanes in their pockets on passing the cam, and means for returning the said vanes to their previously adjusted position.

5. In a hydraulic change gear of the type described, the combination of a casing with the body of the gear provided with pockets, the said gear body dividing the interior of the casing into two annular chambers filled with liquid, balanced vanes rotatably arranged with their shafts in the said body and shaped to relieve axial shifting, stops connected to the shafts of the vanes, a cam connected with the casing and cooperating with the vanes, a suction compartment formed by the said vanes within one of the two annular chambers and connected with the other one of the two chambers, a slide operatively connected with a toothed socket and adapted to adjust the said vanes from the outside, a segment attached to the casing and adapted to engage the said stops to turn the vanes in their pockets in the gear body part on passing the cam, and means for returning the said vanes to their previously adjusted position.

In testimony whereof I have affixed my signature.

FRITZ WAAP.